United States Patent
Narimatsu et al.

(10) Patent No.: US 8,615,040 B2
(45) Date of Patent: Dec. 24, 2013

(54) TRANSCODER FOR CONVERTING A FIRST STREAM INTO A SECOND STREAM USING AN AREA SPECIFICATION AND A RELATION DETERMINING FUNCTION

(75) Inventors: Nobumasa Narimatsu, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 417 days.

(21) Appl. No.: 13/057,111

(22) PCT Filed: Mar. 6, 2009

(86) PCT No.: PCT/JP2009/054273
§ 371 (c)(1),
(2), (4) Date: Feb. 1, 2011

(87) PCT Pub. No.: WO2010/016290
PCT Pub. Date: Feb. 11, 2010

(65) Prior Publication Data
US 2011/0134997 A1    Jun. 9, 2011

(30) Foreign Application Priority Data
Aug. 5, 2008  (JP) .................................. 2008-201468

(51) Int. Cl.
*H04N 11/02*    (2006.01)
(52) U.S. Cl.
USPC ............ 375/240.03; 375/240.04; 375/240.21; 382/239; 704/200
(58) Field of Classification Search
USPC .................................................. 375/240.03
See application file for complete search history.

(56) References Cited

U.S. PATENT DOCUMENTS 5,231,484 A * 7/1993 Gonzales et al. ......... 375/240.04
6,266,374 B1 * 7/2001 Choi ......................... 375/240.21

(Continued)

FOREIGN PATENT DOCUMENTS

JP    2001 78193    3/2001
JP    2001 136530    5/2001

(Continued)

OTHER PUBLICATIONS

International Search Report Issued Jun. 9, 2009 in PCT/JP09/054273 filed Mar. 6, 2009.

(Continued)

*Primary Examiner* — William C Vaughn, Jr.
*Assistant Examiner* — Luis M Perez
(74) *Attorney, Agent, or Firm* — Oblon, Spivak, McClelland, Maier & Neustadt, L.L.P.

(57) ABSTRACT

A technique for suppressing a significant variation of a quantization step value and enabling a stable rate control to be performed. A function is used for calculating a quantization step conversion factor from a bit rate ratio is a straight line with an inclination of −1, intersecting a function at a reference point. The function is a monotone decreasing exponential function. A reference bit rate ratio ($R_0$) is expressed as $R_0 = T/S$ by using a total bit rate (S) of a first stream and a total target bit rate (T) of a second stream. The function appropriately represents a relation between the bit rate ratio and the quantization step conversion factor in coding conversion but has a large rate of variation in an area where the bit rate ratio is about 0.5. The function has a small rate of variation and can suppress a significant variation of the quantization step conversion value.

10 Claims, 6 Drawing Sheets

(56) References Cited

U.S. PATENT DOCUMENTS

| | | | |
|---|---|---|---|
| 6,587,508 B1 * | 7/2003 | Hanamura et al. | 375/240.24 |
| 7,106,799 B1 | 9/2006 | Sostawa et al. | |
| 7,263,126 B2 * | 8/2007 | Zhao et al. | 375/240.04 |
| 7,397,855 B2 * | 7/2008 | Chen | 375/240.04 |
| 7,409,097 B2 * | 8/2008 | Zhang et al. | 382/239 |
| 7,650,277 B2 * | 1/2010 | Prakash et al. | 704/200.1 |
| 2003/0095594 A1 | 5/2003 | Laksono et al. | |
| 2005/0041689 A1 * | 2/2005 | Wu et al. | 370/477 |
| 2005/0105815 A1 * | 5/2005 | Zhang et al. | 382/251 |
| 2006/0256861 A1 * | 11/2006 | Laksono et al. | 375/240.03 |
| 2008/0031337 A1 | 2/2008 | Hasegawa et al. | |
| 2008/0159387 A1 * | 7/2008 | Dvir et al. | 375/240.03 |

FOREIGN PATENT DOCUMENTS

| | | |
|---|---|---|
| JP | 2005 510980 | 4/2005 |
| JP | 2006 295449 | 10/2006 |
| JP | 2008 42426 | 2/2008 |

OTHER PUBLICATIONS

U.S. Appl. No. 13/401,198, filed Feb. 21, 2012, Hasegawa, et al.

* cited by examiner

RATIO OF BIT RATES

TRANSCODER FOR CONVERTING A FIRST STREAM INTO A SECOND STREAM USING AN AREA SPECIFICATION AND A RELATION DETERMINING FUNCTION

TECHNICAL FIELD

The present invention relates to a transcoder for converting an input stream into a different output stream by decoding, and more particularly to a technique to appropriately control the amount of generated codes of the output stream toward a target bit rate.

BACKGROUND ART

Images to be delivered on digital broadcasts, those to be stored in media such as DVDs and hard disks, and the like are compressed by various coding systems. The object for such compressions is to decrease the burden on a transmission band, increase the transmission speed, decrease the memory size, or the like.

There are various standards for image coding system, such as MPEG2 and H.264. And there is a case where the coding system is changed for the purpose of reducing the amount of codes in a coded image that is inputted, or the like. A transcoder once decodes the inputted coded image. Then, the transcoder encodes the decoded image by a different coding system (or the same coding system) again. Thus, the transcoder controls a bit rate of an output stream.

The following Patent Document 1 discloses a technique for calculating a quantization step value of an output stream in a transcoder. In the following Patent Document 1, the quantization step value is adjusted in consideration of the degree of dispersion of pixels in a macroblock of a decoded image and a motion evaluation value.

[Patent Document 1] Japanese Patent Application Laid Open Gazette No. 2008-42426

In a case where the quantization step value of the output stream is controlled in order to keep the bit rate constant or reduce the bit rate, the variation of the quantization step may increase depending on the condition of an input stream or the calculation condition. When the variation of the quantization step becomes large, a rate control becomes unstable and this causes degradation of image quality.

DISCLOSURE OF INVENTION

The present invention is intended for a transcoder for converting a first stream into a second stream. According to an aspect of the present invention, the transcoder comprises a conversion value calculation part for calculating a quantization step conversion value of the first and second streams from a ratio of bit rates of the first and second streams and a quantization step value calculation part for calculating a quantization step value of the second stream by multiplying a quantization step value of the first stream by the quantization step conversion value, and in the transcoder of the present invention, the conversion value calculation part calculates the quantization step conversion value from the ratio of bit rates by using an area specification function for specifying an area to which a relation between the ratio of bit rates and the quantization step conversion value belongs and a relation determining function for determining a specific relation between the ratio of bit rates and the quantization step conversion value in the area.

With the area specification function, optimal characteristics for coding conversion can be maintained, and with the relation determining function, the variation of the quantization step conversion value can be adjusted.

According to a preferred embodiment of the present invention, assuming that a ratio between a bit rate of a converted first stream in a past period and a target bit rate of a second stream is determined as a current bit rate ratio, in a case where a difference between the quantization step conversion value calculated for the current bit rate ratio by using the area specification function and the quantization step conversion value calculated for the current bit rate ratio by using the relation determining function exceeds a predetermined threshold value, the reference bit rate ratio is updated with the current bit rate ratio.

It is thereby possible to prevent the characteristics of the relation determining function from becoming significantly different from those of the area specification function.

According to another preferred embodiment of the present invention, a rate of change of the relation determining function is smaller than that of the area specification function near the reference bit rate ratio.

With the characteristics of the area specification function, a relation appropriate for coding conversion can be maintained, and with the relation determining function, a significant variation of the quantization step conversion value can be suppressed.

Therefore, it is an object of the present invention to provide a technique for suppressing a significant variation of a quantization step value and enabling a stable rate control to be performed.

These and other objects, features, aspects and advantages of the present invention will become more apparent from the following detailed description of the present invention when taken in conjunction with the accompanying drawings.

BEST MODE FOR CARRYING OUT THE INVENTION

Figure 1:
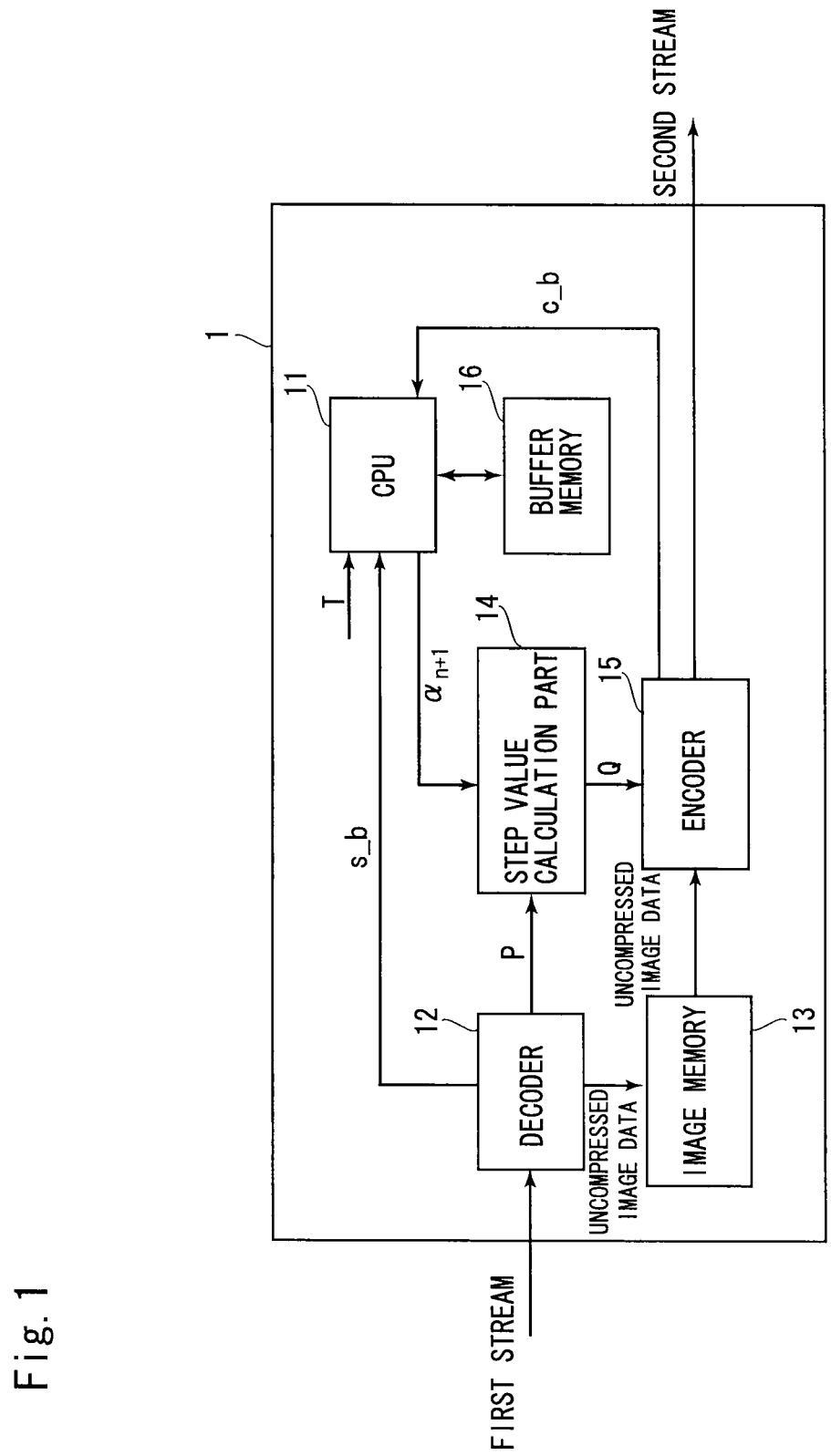
[FIG. 1] is a block diagram showing a transcoder.

{The First Preferred Embodiment}
<1. Constitution of Transcoder>
Hereinafter, with reference to figures, the preferred embodiments of the present invention will be discussed. FIG. 1 is a block diagram showing a transcoder 1 in accordance with the preferred embodiments. The transcoder 1 comprises a CPU 11, a decoder 12, an image memory 13, a step value calculation part 14, an encoder 15, and a buffer memory 16.

The decoder 12 inputs a first stream. The first stream is a stream of coded image. The decoder 12 decodes the first stream and outputs uncompressed image data to the image memory 13. The encoder 15 again codes the decoded and uncompressed image data which is stored in the image memory 13, to thereby output a second stream.

The transcoder 1 converts a coding system of stream. For example, the transcoder 1 inputs a first stream coded in MPEG2 and outputs a second stream coded in H.264. Alternatively, the transcoder 1 outputs a stream of the same coding system. For example, the transcoder 1 inputs a first stream coded in MPEG2 and outputs a second stream coded in MPEG2 again.

Various computations performed in the decoder 12, the step value calculation part 14, and the encoder 15 may be implemented by hardware or may be implemented by software operations. In other words, these processing parts may be constructed as hardware circuits or implemented by a CPU and programs stored in memories. Alternatively, there may be a case where some of the computations are performed by hardware and the others are performed by software.

<2. Control Unit Time and Information within Control Unit Time>

Figure 2:
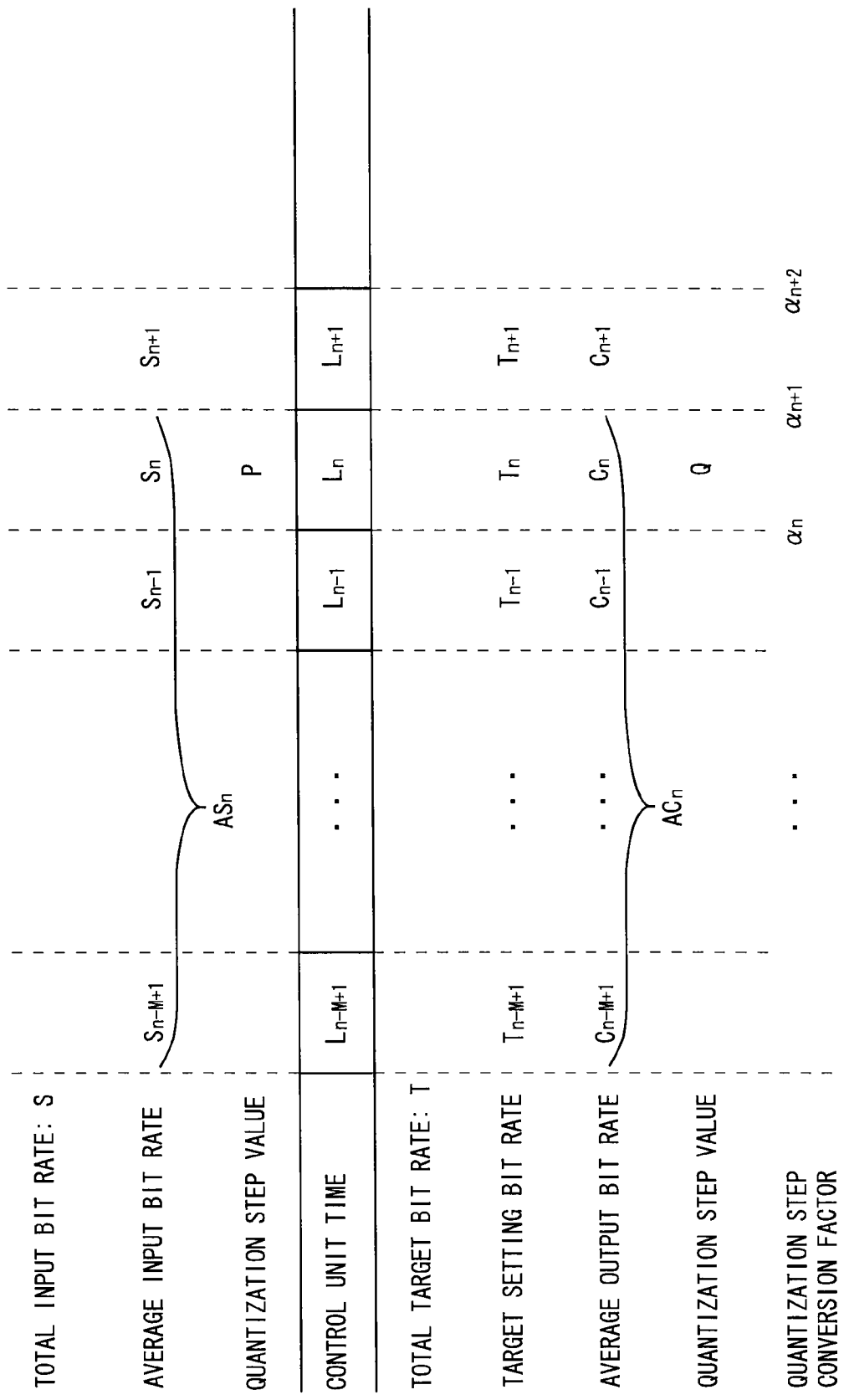
[FIG. 2] is a view showing information on an input stream (first stream) and an output stream (second stream) per control unit time.

FIG. 2 is a view showing information on streams that the transcoder 1 inputs or outputs per control unit time. The transcoder 1 divides the processing time base into control unit times $L_n$ (n=1, 2 . . . ) and performs a rate control by using this control unit time $L_n$ as a unit of processing. In the following discussion, the control unit time $L_n$ is referred to as "the n period" as appropriate. As to the control unit time $L_n$, one frame, a plurality of successive frames, one GOP, a plurality of successive GOPs, or the like may be set as one unit time.

A total input bit rate S of the first stream is acquired from a sequence header or the like. An average input bit rate $S_n$ is an average bit rate of the first stream in the n period. The transcoder 1 is capable of storing information on the average input bit rates $S_n$ for M periods in the buffer memory 16. Specifically, the buffer memory 16 is capable of storing information on the average input bit rates $S_n$ from the (n−M+1) period to the n period. An average period bit rate $AS_n$ is an average value of the average input bit rates $S_n$ from the (n−M+1) period to the n period. The average period bit rate $AS_n$ is expressed by Eq. (1).

$$AS_n = \frac{1}{M} \sum_{n-M+1}^{n} S_i \quad (1)$$

A total target bit rate T of the second stream is set by a user. For example, the user sets the total target bit rate T by using a not-shown operation part provided in the transcoder 1.

A target setting bit rate $T_n$ is a target bit rate of the second stream in the n period. An average output bit rate $C_n$ is an average bit rate of the already-converted second stream in the n period. The transcoder 1 is capable of storing information on the average output bit rates $C_n$ for M periods in the buffer memory 16. Specifically, the buffer memory 16 is capable of storing information on the average output bit rates $C_n$ from the (n−M+1) period to the n period. An average period bit rate $AC_n$ is an average value of the average output bit rates $C_n$ from the (n−M+1) period to the n period. The average period bit rate $AC_n$ is expressed by Eq. (2).

$$AC_n = \frac{1}{M} \sum_{n-M+1}^{n} C_i \quad (2)$$

Though a buffer period used for calculation of the average period bit rate $AS_n$ or $AC_n$ is linked to the control unit time $L_n$ in the preferred embodiments, setting of the buffering period is not limited to this case. For example, one past frame, a plurality of successive past frames, one past GOP, a plurality of successive past GOPs, or the like at the point of time when the coding is completed may be set as the buffering period.

A quantization step conversion factor $\alpha_n$ is a factor calculated at the point of time when the (n−1) period is ended. By multiplying a value P, which is a quantization step value of the first stream or a value calculated from the quantization step value of the first stream, by the quantization step conversion factor $\alpha_n$, a quantization step value Q of the second stream is determined. This relation is expressed by Eq. (3).

$$Q = \alpha_n P \quad (3)$$

Referring back to FIG. 1, the CPU 11 acquires a bit rate s_b for each picture of the first stream from the decoder 12 and stores the bit rate s_b into the buffer memory 16. The CPU 11 calculates the average input bit rate $S_n$ and the average period bit rate $AS_n$ of the n period on the basis of the bit rate s_b stored in the buffer memory 16.

The decoder 12 outputs a quantization step value P for each macroblock of the first stream to the step value calculation part 14.

The CPU 11 acquires a bit rate c_b for each picture of the converted second stream from the encoder 15 and stores the bit rate c_b into the buffer memory 16. The CPU 11 calculates the average output bit rate $C_n$ and the average period bit rate $AC_n$ of the n period on the basis of the bit rate c_b stored in the buffer memory 16.

The CPU 11 further acquires the total target bit rate T set by the user.

The CPU 11 uses information such as the total target bit rate T, the average output bit rate $C_n$, the average period bit rate $AC_n$, the average input bit rate $S_n$, and the average period bit rate $AS_n$ to determine a target setting bit rate $T_{n+1}$ of the second stream in the (n+1) period. A method of calculating the target setting bit rate $T_{n+1}$ will be discussed in the next section <3. Exemplary Calculation of Target Bit Rate>.

Further, the CPU 11 calculates a quantization step conversion factor $\alpha_{n+1}$ from the target setting bit rate $T_{n+1}$ of the second stream in the (n+1) period by using a function f which is a characteristic feature of the present invention and outputs the quantization step conversion factor $\alpha_{n+1}$ to the step value calculation part 14. The function f will be described later in the section <4. Calculation of Conversion Factor>.

The step value calculation part 14 inputs the quantization step value P and the quantization step conversion factor $\alpha_{n+1}$ and performs the computation expressed by Eq. (3) to calculate the quantization step value Q of the second stream. The step value calculation part 14 gives the calculated quantization step value Q to the encoder 15.

The encoder 15 encodes the uncompressed image data on the basis of the quantization step value Q inputted from the step value calculation part 14, to thereby generate the second stream.

<3. Exemplary Calculation of Target Bit Rate>

Next, an exemplary calculation of the target setting bit rate $T_{n+1}$ of the second stream in the (n+1) period will be discussed. The transcoder 1 determines the target setting bit rate $T_{n+1}$ of the second stream in the (n+1) period during the n period.

Eq. (4) is an equation for calculation of the target setting bit rate $T_{n+1}$ of the (n+1) period. Specifically, assuming that a value obtained by dividing the average output bit rate $C_n$ of the already-converted second stream in the n period by the target setting bit rate $T_n$ of the n period is determined as a target ratio, the target setting bit rate $T_{n+1}$ of the (n+1) period can be calculated by dividing the total target bit rate T of the second stream by the target ratio.

$$T_{n+1} = k * \frac{T}{\frac{C_n}{T_n}} \quad (4)$$

In Eq. (4), "k" is a positive factor and a factor for adjusting the target setting bit rate $T_{n+1}$. Thus, a ratio of the average output bit rate to the target setting bit rate in the n period is calculated by $C_n/T_n$, and by dividing the total target bit rate T by the target ratio, the target setting bit rate $T_{n+1}$ of the (n+1) period is adjusted and controlled so that the bit rate should be close to the target bit rate on the whole.

Though the value obtained by dividing the average output bit rate $C_n$ of the second stream in the n period by the target setting bit rate $T_n$ is used as the target ratio in Eq. (4), the target ratio is further adjusted in Eq. (5).

$$T_{n+1} = k * \frac{T}{\frac{S_{n-1}}{S_n} * \frac{C_n}{T_n}} \quad (5)$$

In Eq. (5), the target ratio is multiplied by $S_{n-1}/S_n$. The $S_{n-1}/S_n$ is a value obtained by dividing the average input bit rate $S_{n-1}$ of the first stream in the (n−1) period by the average input bit rate $S_n$ of the first stream in the n period and may be referred to as a period ratio of the average input bit rates. In other words, the target ratio is adjusted by multiplying the target ratio by the period ratio.

Thus, by multiplying the target ratio by the period ratio, it is possible to correct local variation of the target ratio. When the average input bit rate $S_n$ locally decrease, for example, the target ratio $C_n/T_n$ also accordingly decrease in some cases. Even in such a case, the target ratio is adjusted by multiplying the target ratio by the period ratio $S_{n-1}/S_n$ (the period ratio takes a value larger than 1 in this case) and it is possible to avoid significant variation of the target setting bit rate $T_{n+1}$. In the reverse case where the average input bit rate $S_n$ locally increase, the period ratio $S_{n-1}/S_n$ takes a value smaller than 1 and it is possible to suppress a significant increase of the target ratio.

In Eq. (5), the value obtained by dividing the average input bit rate $S_{n-1}$ of the first stream in the (n−1) period by the average input bit rate $S_n$ of the first stream in the n period is used as the period ratio. On the other hand, in a case where an average input bit rate $S_{n+1}$ of the first stream in the (n+1) period can be obtained in advance, the average input bit rate $S_{n+1}$ may be used. The case where the average input bit rate $S_{n+1}$ can be obtained in advance refers to a case where there is spare time to perform buffering of information on the average input bit rate $S_{n+1}$ and then calculate the target setting bit rate $T_{n+1}$ of the (n+1) period. In other words, it refers to a case where a processing delay to some degree is allowed. Calculation of the target setting bit rate $T_{n+1}$ by using the average input bit rate $S_{n+1}$ is expressed by Eq. (6).

$$T_{n+1} = k * \frac{T}{\frac{S_n}{S_{n+1}} * \frac{C_n}{T_n}} \quad (6)$$

As expressed by Eq. (6), as the period ratio, used is $S_n/S_{n+1}$, i.e., a value obtained by dividing the average input bit rate $S_n$ of the first stream in the n period by the average input bit rate $S_{n+1}$ of the first stream in the (n+1) period. Thus, by using the average input bit rate $S_{n+1}$ of the first stream in the (n+1) period, the target setting bit rate $T_{n+1}$ can be controlled with higher accuracy. In other words, by using the latest input information, it is possible to ensure optimal control of the target bit rate.

In Eq. (5), $S_{n-1}/S_n$ is used as the period ratio. Instead, a ratio between an average period bit rate $AS_{n-1}$ for past M periods including the (n−1) period and an average period bit rate $AS_n$ for past M periods including the n period may be used as the period ratio. In other words, in Eq. (5), $AS_{n-1}/AS_n$ may be used as the period ratio, instead of $S_{n-1}/S_n$. It is thereby possible to ensure optimal control of the target setting bit rate $T_{n+1}$ by reducing the effect of the local variation.

Alternatively, in the case where the average input bit rate $S_{n+1}$ of the first stream in the (n+1) period can be obtained in advance, a ratio between the average period bit rate $AS_n$ for the past M periods including the n period and an average period bit rate $AS_{n+1}$ for past M periods including the (n+1) period may be used as the period ratio. In other words, in Eq. (5), $AS_n/AS_{n+1}$ may be used as the period ratio, instead of $S_{n-1}/S_n$. It is thereby possible to control the target setting bit rate $T_{n+1}$ with higher accuracy by reducing the effect of the local variation and using the latest input bit rate.

Further, an average period bit rate $AC_n$ from the (n−M+1) period to the n period may be used, instead of the average output bit rate $C_n$ of the n period. In other words, in the above-discussed exemplary calculation expressed by Eqs. (4) to (6) and the like, $AC_n$ is used instead of $C_n$. It is thereby possible to more gently control the target setting bit rate $T_{n+1}$.

Another exemplary calculation of the target setting bit rate $T_{n+1}$ of the (n+1) period is expressed by Eq. (7). Assuming that a value obtained by subtracting the average output bit rate $C_n$ of the already-converted second stream in the n period from the target setting bit rate $T_n$ of the n period is determined as a target difference, the target setting bit rate $T_{n+1}$ of the (n+1) period can be calculated by adding the target difference to the total target bit rate T of the second stream.

$$T_{n+1} = T + k*(T_n - C_n) \quad (7)$$

In Eq. (7), "k" is a positive factor and a factor for adjusting the target setting bit rate $T_{n+1}$. Thus, the difference between the average output bit rate and the target setting bit rate in the n period is calculated by $(T_n - C_n)$, and by adding the target difference to the total target bit rate T, the output stream is controlled to be close to the target bit rate.

Further, the target difference $(T_n - C_n)$ may be multiplied by the period ratio $S_{n-1}/S_n$ or the period ratio $AS_{n-1}/AS_n$. Alternatively, in the case where the average input bit rate $S_{n+1}$ can be obtained in advance, the target difference $(T_n - C_n)$ may be multiplied by the period ratio $S_n/S_{n+1}$ or the period ratio $AS_n/AS_{n+1}$. Furthermore, $AC_n$ may be used instead of $C_n$.

<4. Calculation of Conversion Factor>

After the target setting bit rate $T_{n+1}$ in the (n+1) period is calculated, a quantization step conversion factor $\alpha_{n+1}$ is calculated by performing the computation expressed by Eq. (8). Specifically, by substituting a current bit rate ratio $T_{n+1}/S_n (=R_B)$ into the function f, the quantization step conversion factor $\alpha_{n+1}$ of the (n+1) period is calculated.

$$\alpha_{n+1} = f(T_{n+1}/S_n) \quad (8)$$

In Eq. (8), the function f is a function for obtaining a "ratio of quantization step values" (quantization step conversion factor) from a "ratio of bit rates". The "ratio of bit rates" refers to a ratio of the bit rate of the second stream to the bit rate of the first stream. As the bit rate of the first stream, used is S, $S_n$, or the like. As the bit rate of the second stream, used is T, $T_n$ or the like. The "ratio of quantization step values" refers to a ratio of the quantization step value of the second stream to the quantization step value of the first stream. Assuming that the "ratio of bit rates" is $R_B$ and the "ratio of quantization step values" is $R_Q$, the function f is generally expressed by Eq. (9).

$$R_Q = f(R_B) \quad (9)$$

An initial value $\alpha_1$ of the quantization step conversion factor $\alpha_n$ is expressed by Eq. (10). Specifically, by substituting a value obtained by dividing the total target bit rate T of the second stream by the total input bit rate S of the first stream, i.e., the ratio of bit rates into the function f, obtained is the initial value $\alpha_1$ of the quantization step conversion factor.

$$\alpha_1 = f(T/S) \quad (10)$$

The value obtained by dividing the total target bit rate T of the second stream by the total input bit rate S of the first stream is referred to as a reference bit rate ratio $R_0$ as expressed by Eq. (11).

$$R_0 = T/S \quad (11)$$

The function f will be described in more detail. As discussed above, the function f is a function used for calculating the quantization step conversion factor $\alpha_n$ from the "ratio of bit rates". Eq. (12) represents a function $f_1$ as a function of the first preferred embodiment.

$$f_1(x) = -x + R_0 + \epsilon R_0^{-\delta} \quad (12)$$

The function $f_1$ is a straight line with an inclination of $-1$, passing through a point $(R_0, f_0(R_0))$. The function $f_0$ is expressed by Eq. (13). Though the function $f_0$ may be used as the function f, the function $f_0$ is used as an area specification function and a relation determining function $f_1$ obtained by adjusting the local inclination of the area specification function $f_0$ is used to calculate the quantization step conversion factor in the first preferred embodiment.

$$f_0(x) = \epsilon x^{-\delta} = 2.1 * x^{-1.1} \quad (13)$$

In Eq. (13), as values of $\epsilon$ and $\delta$ in the case of stream conversion from MPEG2 into H.264, shown are specific numerical values calculated on the basis of an experiment or the like. Specifically, as the result of the experiment, when $\epsilon=2.1$ and $\delta=1.1$, excellent characteristics can be obtained. Though the function $f_0$ is used in common for all the pictures in the first preferred embodiment, functions having different characteristics may be used for the picture types (I picture, P picture, and B picture).

Figure 3:
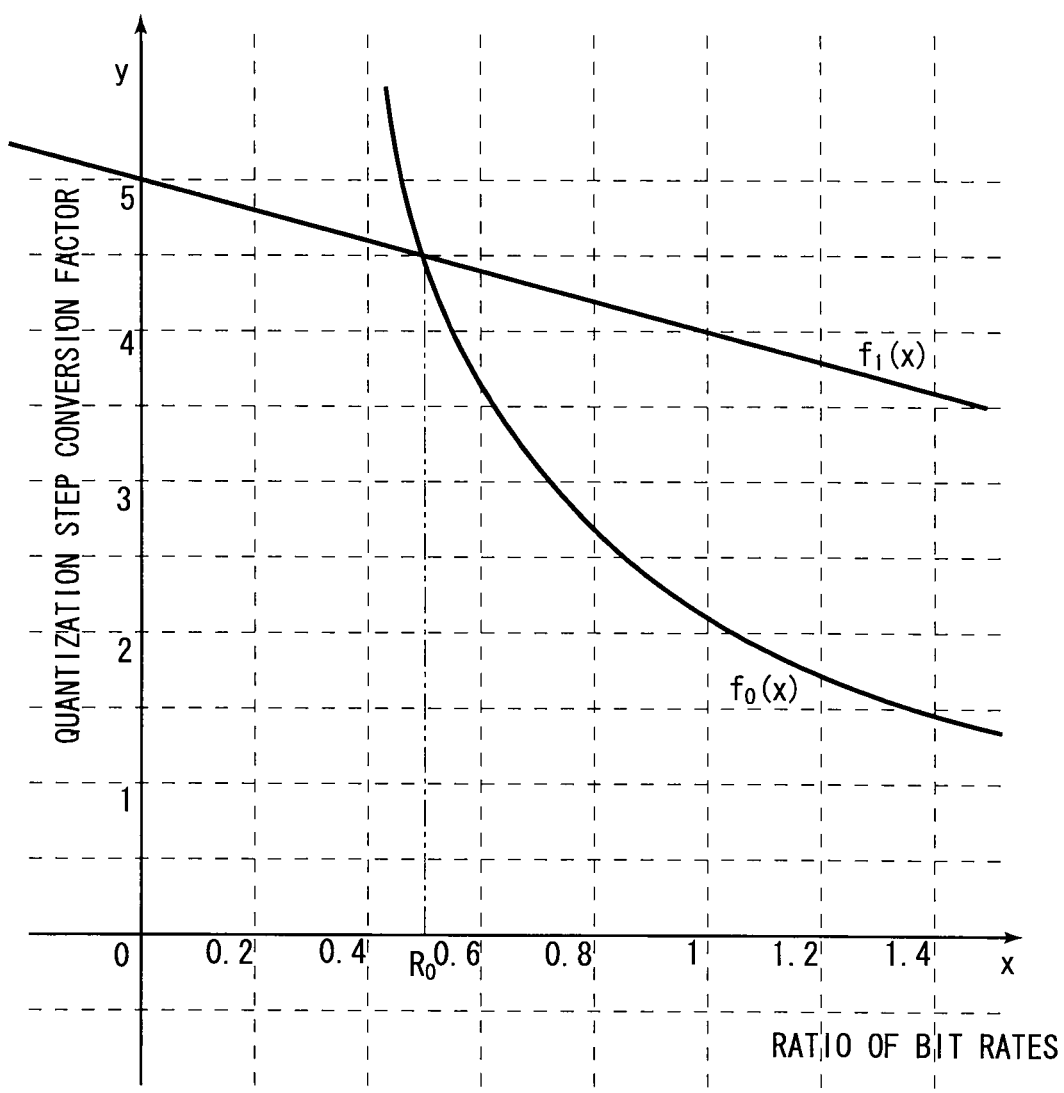
[FIG. 3] is a view showing characteristics of functions $f_1$ and $f_0$.

FIG. 3 is a view showing the function $f_1$ and the function $f_0$. In FIG. 3, the x axis represents the ratio of bit rates and the y axis represents the quantization step conversion factor. As the function $f_1$ and the function $f_0$, specific values $\epsilon=2.1$ and $\delta=1.1$ are used. The function $f_0$ is an exponential function and has a larger inclination in an area where the ratio of bit rates is small. Assuming that the ratio of bit rates varies from about 0.4 to 0.6, in the function $f_0$, the quantization step conversion factor significantly varies in this area. Therefore, when the $f_0$ is used as the function f, the variation of the quantization step conversion factor becomes larger in the area where the ratio of bit rates is small. Then, the quantization step conversion factor is calculated by using the function $f_1$ of which the variation is smaller than that of the function $f_0$ in an area near the reference bit rate ratio $R_0$. FIG. 3 shows a case where the reference bit rate ratio $R_0=0.5$.

In other words, the area specification function $f_0$ serves to broadly specify an area used for determining the relation between the ratio of bit rates and the quantization step conversion factor, and in the area, the function $f_1$ serves to specifically determine the relation between the ratio of bit rates and the quantization step conversion factor. As discussed above, the function $f_0$ is obtained on the basis of the experiment or the like and can keep the relation between the ratio of bit rates and the quantization step conversion factor good in the case of stream conversion from MPEG2 into H.264. As discussed above, however, the function $f_1$ is used lest the variation of the quantization step conversion factor becomes larger when the ratio of bit rates ranges from about 0.4 to 0.6.

The function $f_1$ intersects the function $f_0$ at the point $(R_0, f_0(R_0))$. In other words, the function $f_1$ maintains the characteristics relatively close to those of the function $f_0$ near the reference bit rate ratio $R_0$. As the function $f_1$ goes farther from the point $(R_0, f_0(R_0))$, however, the characteristics of the function $f_1$ become more different from those of the function $f_0$. When the characteristics of the $f_1$ become significantly different from those of the function $f_0$, the characteristics of the function $f_0$ cannot be maintained and it is improper to continue to use the function $f_1$. Therefore, the function $f_1$ is used as far as the relation of Eq. (14) is satisfied.

$$|f_0(R_B) - f_1(R_B)| \leq 0.5 \quad (14)$$

In Eq. (14), $R_B$ represents a current bit rate ratio which is expressed by Eq. (15).

When the relation of Eq. (14) is not satisfied, the reference bit rate ratio $R_0$ is updated with the current bit rate ratio $R_B$ expressed by Eq. (15).

$$R_B = T_{n+1}/S_n \quad (15)$$

Figure 4:
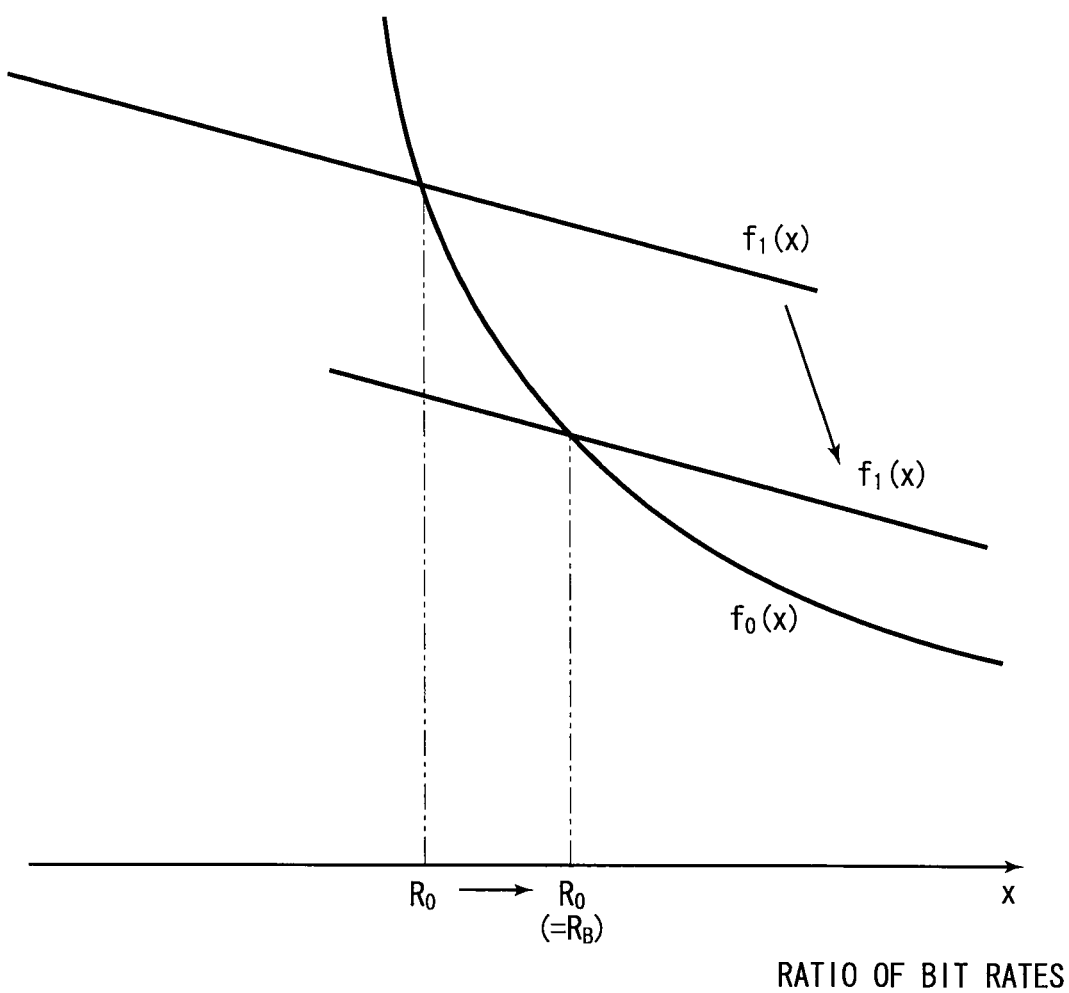
[FIG. 4] is a view showing an update of a reference bit rate ratio $R_0$ and an update of the function $f_1$.

The reference point $(R_0, f_0(R_0))$ is thereby updated as shown in FIG. 4, and the function $f_1$ is accordingly updated. Specifically, while the function $f_1$ is moved along the area specified by the function $f_0$, the quantization step conversion factor is calculated by using the function $f_1$. Thus, by using both the characteristics of the function $f_0$ and the function $f_1$, it is possible to ensure optimal rate control.

Though $T_{n+1}/S_n$ is used as the ratio of bit rates as expressed by Eq. (8) in the above-discussed preferred embodiment, the quantization step conversion factor $\alpha_{n+1}$ may be calculated by using the average period bit rate $AS_n$ from the (n–M+1) period to the n period as expressed by Eq. (16) instead of the average input bit rate $S_n$ of the n period.

$$\alpha_{n+1} = f(T_{n+1}/AS_n) \quad (16)$$

In the process of calculating the target setting bit rate $T_{n+1}$, in the case of using the average input bit rate $S_{n+1}$ of the first stream in the (n+1) period as expressed by Eq. (6), as expressed by Eq. (17) instead of Eq. (8), by substituting the ratio between the target setting bit rate $T_{n+1}$ of the (n+1) period and the average input bit rate $S_{n+1}$ of the (n+1) period into the function f (function $f_1$), the quantization step conversion factor $\alpha_{n+1}$ of the (n+1) period can be calculated.

$$\alpha_{n+1} = f(T_{n+1}/S_{n+1}) \quad (17)$$

In the process of calculating the target setting bit rate $T_{n+1}$, in the case of using the average period bit rate $AS_{n+1}$ for past M periods including the (n+1) period, as expressed by Eq. (18) instead of Eq. (16), by substituting the ratio between the target setting bit rate $T_{n+1}$ of the (n+1) period and the average period bit rate $AS_{n+1}$ for past M periods including the (n+1) period into the function f (function $f_1$), the quantization step conversion factor $\alpha_{n+1}$ of the (n+1) period can be calculated.

$$\alpha_{n+1} = f(T_{n+1}/AS_{n+1}) \quad (18)$$

Though the inclination of the function $f_1$ is $-1$ in the first preferred embodiment, this is only one exemplary case. Optimal one among negative inclinations where the variation of the function $f_1$ is smaller than that of the function $f_0$ has only to be selected. Further, though the threshold value is set to be 0.5 in Eq. (14), this is also only one exemplary case. By freely setting the threshold value, it is possible to freely set an area near the reference bit rate ratio $R_0$ (similarly, the updated reference bit rate ratio $R_0$).

{The Second Preferred Embodiment}

Next, the second preferred embodiment of the present invention will be discussed. The second preferred embodiment is different from the first preferred embodiment in the function f. Eq. (19) represents a function $f_2$ to be used as the function f in the second preferred embodiment.

$$f_2(x) = \frac{R_0^2}{x} - R_0 + \varepsilon R_0^{-\delta} \qquad (19)$$

The function $f_2$ is a rectangular hyperbola passing through the point $(R_0, f_0(R_0))$ and having a tangential line p(x) with an inclination of −1 at the point $(R_0, f_0(R_0))$. The function $f_0$ is the same as that expressed by Eq. (13).

Figure 5:
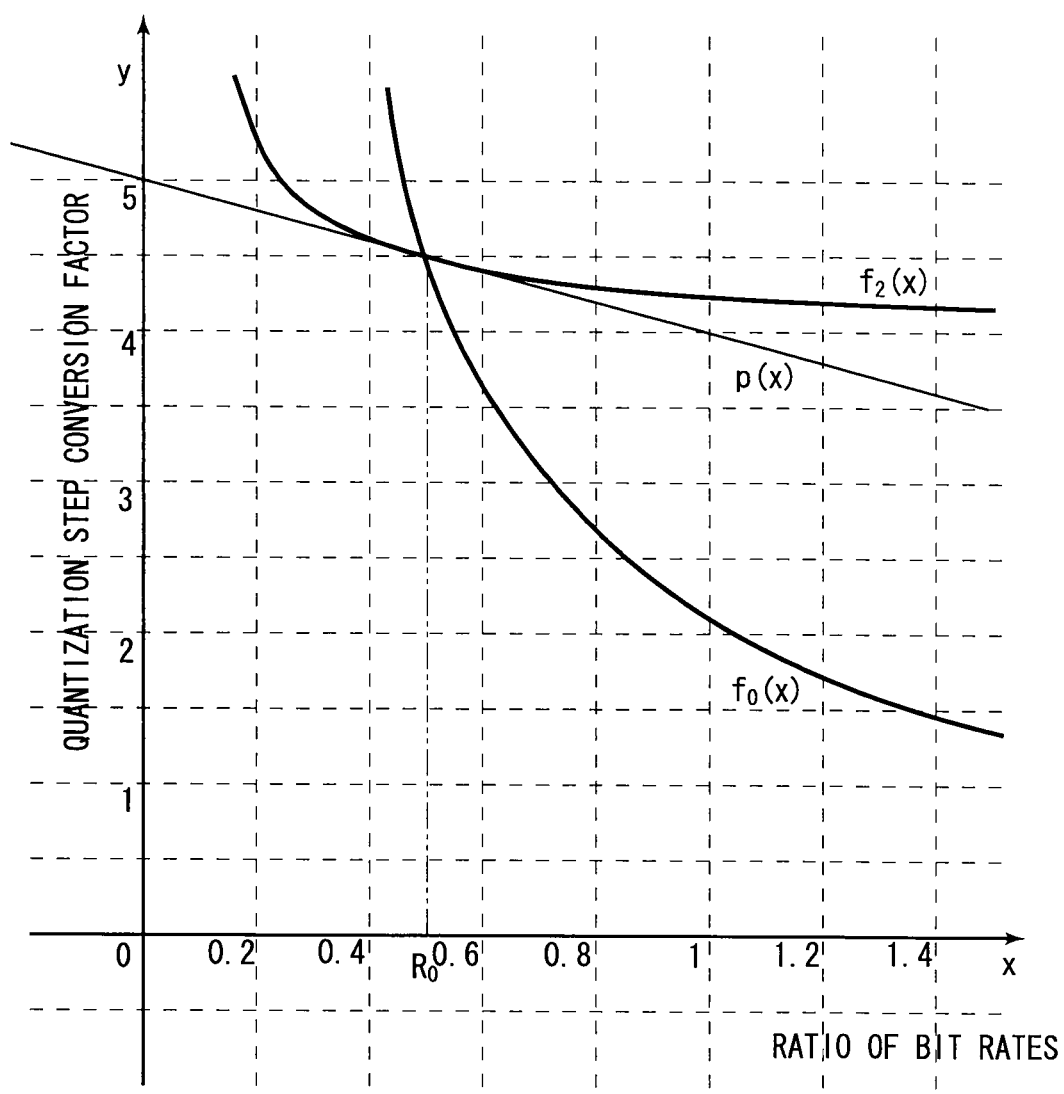
[FIG. 5] is a view showing characteristics of functions $f_2$ and $f_0$.

FIG. 5 is a view showing the function $f_2$ and the function $f_0$. In FIG. 5, the x axis represents the ratio of bit rates and the y axis represents the quantization step conversion factor. As the function $f_2$ and the function $f_0$, specific values $\varepsilon=2.1$ and $\delta=1.1$ are used. As discussed above, the function $f_0$ is an exponential function and has a larger inclination in an area where the ratio of bit rates is small. Then, the quantization step conversion factor is calculated by using the function $f_2$ of which the variation is smaller than that of the function $f_0$ in an area near the reference bit rate ratio $R_0$.

Like in the first preferred embodiment, the $f_0$ serves as the area specification function for broadly specifying an area used for determining the relation between the ratio of bit rates and the quantization step conversion factor, and in the area, the function $f_2$ serves as the relation determining function for specifically determining the relation between the ratio of bit rates and the quantization step conversion factor.

The function $f_2$ intersects the function $f_0$ at the point $(R_0, f_0(R_0))$. In other words, the function $f_2$ maintains the characteristics relatively close to those of the function $f_0$ near the reference bit rate ratio $R_0$. As the function $f_2$ goes farther from the point $(R_0, f_0(R_0))$, however, the characteristics of the function $f_2$ become more different from those of the function $f_0$. When the characteristics of the $f_2$ become significantly different from those of the function $f_0$, the characteristics of the function $f_0$ cannot be maintained and it is improper to continue to use the function $f_2$. Therefore, the function $f_2$ is used as far as the relation of Eq. (20) is satisfied.

$$|f_0(R_B)-f_2(R_B)| \leq 0.5 \qquad (20)$$

When the relation of Eq. (20) is not satisfied, the reference bit rate ratio $R_0$ is updated with the current bit rate ratio $R_B$ expressed by Eq. (15). The reference point $(R_0, f_0(R_0))$ is thereby updated, and the function $f_2$ is accordingly updated. Specifically, while the function $f_2$ is moved along the area of the function $f_0$, the quantization step conversion factor is calculated by using the function $f_2$. Thus, by using both the characteristics of the function $f_0$ and the function $f_2$, it is possible to ensure optimal rate control.

Though the inclination of the tangential line p(x) is −1 in the second preferred embodiment, this is only one exemplary case. Optimal one among negative inclinations where the variation of the function $f_2$ is smaller than that of the function $f_0$ has only to be selected. Further, though the threshold value is set to be 0.5 in Eq. (20), this is also only one exemplary case. By freely setting the threshold value, it is possible to freely set an area near the reference bit rate ratio $R_0$ (similarly, the updated reference bit rate ratio $R_0$).

{The Third Preferred Embodiment}

Next, the third preferred embodiment of the present invention will be discussed. The third preferred embodiment is different from the first preferred embodiment in the function f. Eq. (21) represents a function $f_3$ to be used as the function f in the third preferred embodiment.

$$f_3(x) = -\varepsilon \delta R_0^{-(1+\delta)}\left(x - \frac{1+\delta}{\delta}R_0\right) \qquad (21)$$

The function $f_3$ is a straight line passing through the point $(R_0, f_0(R_0))$ and tangent to the function $f_0$ at the point $(R_0, f_0(R_0))$. The function $f_0$ is the same as that expressed by Eq. (13).

Figure 6:
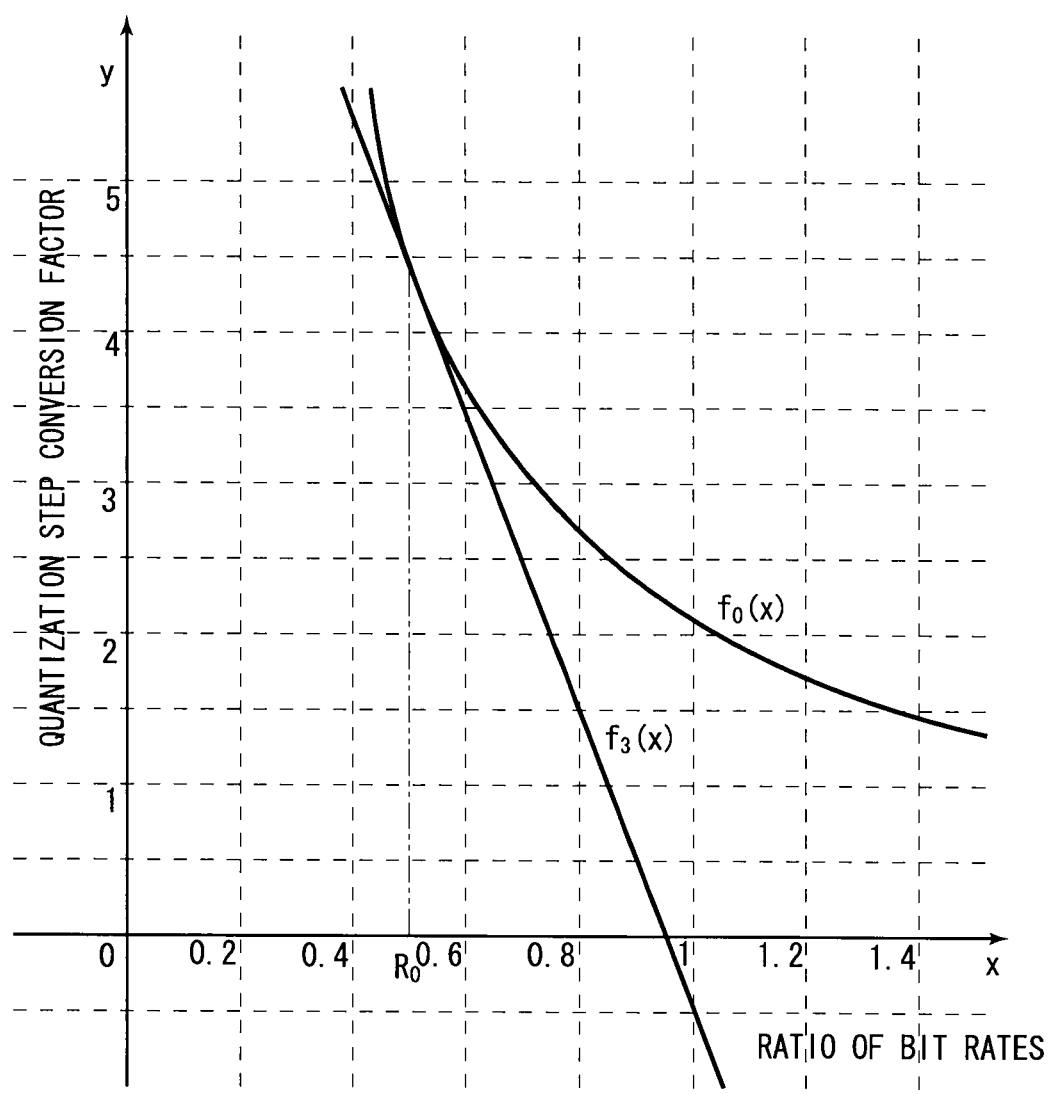
[FIG. 6] is a view showing characteristics of functions $f_3$ and $f_0$.

FIG. 6 is a view showing the function $f_3$ and the function $f_0$. In FIG. 6, the x axis represents the ratio of bit rates and the y axis represents the quantization step conversion factor. As the function $f_3$ and the function $f_0$, specific values $\varepsilon=2.1$ and $\delta=1.1$ are used.

Herein, the function $f_3$ has characteristics different from those of the functions $f_1$ and $f_2$. Specifically, the function $f_3$ so acts as to reduce the variation of the quantization step conversion factor in an area where the bit rate ratio is smaller than the point $(R_0, f_0(R_0))$ and so acts as to increase the variation of the quantization step conversion factor in an area where the bit rate ratio is larger than the point $(R_0, f_0(R_0))$.

Like in the first and second preferred embodiments, the $f_0$ serves as the area specification function for broadly specifying an area used for determining the relation between the ratio of bit rates and the quantization step conversion factor, and in the area, the function $f_3$ serves as the relation determining function for specifically determining the relation between the ratio of bit rates and the quantization step conversion factor.

Further, the condition for using the function $f_3$ is the same as that in the first and second preferred embodiments. The function $f_3$ is used as far as the relation of Eq. (22) is satisfied.

$$|f_0(R_B)-f_3(R_B)| \leq 0.5 \qquad (22)$$

In the third preferred embodiment, however, it is preferable to make the condition for using the function $f_3$ more restrictive. As discussed above, the range of variation of the quantization step conversion factor becomes larger in the area where the bit rate ratio is larger than the point $(R_0, f_0(R_0))$ and this phenomenon becomes more remarkable as the bit rate ratio goes farther from the point $(R_0, f_0(R_0))$. Therefore, in Eq. (22), it is preferable that a value smaller than 0.5, i.e., 0.2 or 0.3, should be set as the threshold value and the function $f_3$ should be used only near the point $(R_0, f_0(R_0))$.

Also like in the first and second preferred embodiments, when the relation of Eq. (22) is not satisfied, the reference bit rate ratio $R_0$ is updated with the current bit rate ratio $R_B$ expressed by Eq. (15).

{Variations 1}

In the above-discussed first to third preferred embodiments, the respective conditions for using the functions $f_1$, $f_2$, and $f_3$ as expressed by Eqs. (14), (20), and (22) are set. Though each of the functions is used on the same condition in the areas where the bit rate ratio is larger than the point $(R_0, f_0(R_0))$ and where the bit rate ratio is smaller than the point $(R_0, f_0(R_0))$ in Eqs. (14), (20), and (22), the condition may be changed. For example, as to the function $f_1$, there may be a method where Eq. (14) is used without any change in the area where the bit rate ratio is smaller than the point $(R_0, f_0(R_0))$ and used is Eq. (14) in which the threshold value is changed from 0.5 to 0.3 in order to make the use condition stricter in the area where the bit rate ratio is larger than the point ($R_0$, $f_0(R_0)$).

As to the function $f_3$, the range of variation of the quantization step conversion factor becomes larger in the area where the bit rate ratio is larger than the point ($R_0$, $f_0(R_0)$) and this phenomenon becomes more remarkable as the bit rate ratio goes farther from the point ($R_0$, $f_0(R_0)$). Then, as to the function $f_3$, there may be a method where Eq. (22) is used without any change in the area where the bit rate ratio is smaller than the point ($R_0$, $f_0(R_0)$) and used is Eq. (22) in which the threshold value is changed from 0.5 to 0.2 in order to make the use condition stricter in the area where the bit rate ratio is larger than the point ($R_0$, $f_0(R_0)$). Since the function $f_3$ is a tangential line of the function $f_0$, the function $f_3$ has characteristics relatively close to those of the function $f_0$ and is given a variation characteristic gentler than that of the function $f_0$ in the area where the bit rate ratio is smaller than the point ($R_0$, $f_0(R_0)$). In the area where the bit rate ratio is larger than the point ($R_0$, $f_0(R_0)$), by using the function $f_3$ only very near the point ($R_0$, $f_0(R_0)$), it is possible to prevent the characteristics of the function $f_3$ from becoming significantly different from those of the function $f_0$.

Different functions may be used with the point ($R_0$, $f_0(R_0)$) as the boundary. For example, the function $f_3$ is used in the area where the bit rate ratio is smaller than the point ($R_0$, $f_0(R_0)$) and the function $f_2$ is used in the area where the bit rate ratio is larger than the point ($R_0$, $f_0(R_0)$). When the function $f_3$ is used in the area where the bit rate ratio is smaller than the point ($R_0$, $f_0(R_0)$), the function $f_3$ has characteristics relatively close to those of the function $f_0$ and is given a variation characteristic gentler than that of the function $f_0$. When the function $f_2$ is used in the area where the bit rate ratio is larger than the point ($R_0$, $f_0(R_0)$), the function $f_2$ has characteristics not significantly different from those of the function $f_0$ and is given a gentler variation characteristic.

Alternatively, there may be a case where the function $f_1$ or $f_2$ is used in the area where the bit rate ratio is smaller than the point ($R_0$, $f_0(R_0)$) and the function $f_0$ is used in the area where the bit rate ratio is larger than the point ($R_0$, $f_0(R_0)$).

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A transcoder for converting a first stream into a second stream, comprising:
   a conversion value calculation processing unit configured to calculate a quantization step conversion value of said first and second streams from a ratio of bit rates of said first and second streams; and
   a quantization step value calculation processing unit configured to calculate a quantization step value of said second stream by multiplying a quantization step value of said first stream by said quantization step conversion value,
   wherein said conversion value calculation processing unit is further configured to calculate said quantization step conversion value from said ratio of bit rates by using an area specification function f0(x) for specifying an area to which a relation between said ratio of bit rates and said quantization step conversion value belongs
   and a relation determining function f1(x) for determining a specific relation between said ratio of bit rates and said quantization step conversion value in said area, and
   determine whether a difference between said quantization step conversion value calculated for a current bit rate ratio using said area specification function f0(x) and said quantization step conversion value calculated for said current bit rate ratio using said relation determining function f1(x) exceeds a predetermined threshold value.

2. The transcoder according to claim 1, wherein said area specification function f0(x) and said relation determining function f1(x) satisfy the following formula:

$$f0(R0)=f1(R0);$$

$$R0=RA2/RA1;$$

where RA1 is a total bit rate of said first stream and RA2 is a total target bit rate of said second stream.

3. The transcoder according to claim 2, wherein
   a ratio between a bit rate of a converted first stream in a past period and a target bit rate of a second stream being a current bit rate ratio, when said difference between said quantization step conversion value calculated for said current bit rate ratio using said area specification function f0(x) and
   said quantization step conversion value calculated for said current bit rate ratio using said relation determining function f1(x) exceeds said predetermined threshold value, said reference bit rate ratio is updated with said current bit rate ratio.

4. The transcoder according to claim 2, wherein
   each of said area specifying function f0(x) and said relation determining function f1(x) is a monotonic decreasing function with respect to x in a range satisfying x>0, x being a bit rate ratio R2/R1 where R1 is a bit rate of said first stream and R2 is a bit rate of said second stream, and
   when the bit rate ratio x is equal to the bit rate R0, said area specifying function f0(x) and said relation determining function flex) satisfy the following formula:

$$\frac{d}{dx}f_1(R0) \geq \frac{d}{dx}f_0(R0).$$

5. The transcoder according to claim 4, wherein said area specification function f0(x) is a monotonic decreasing exponential function with respect to x, where x is the bit rate ratio.

6. The transcoder according to claim 4, wherein
   a line defined by y=f1(x) in an x-y coordinate is a straight line and intersects a curve defined by y=f0(x) in the x-y coordinate at the point where the bit rate ratio x is equal to the reference bit rate ratio R0, and the line defined by y=f1(x) has a negative slope.

7. The transcoder according to claim 4, wherein a curve defined by y=f1(x) in an x-y coordinate is a hyperbola and
   intersects a curve defined by y=f0(x) in the x-y coordinate at the point where the bit rate ratio x is equal to the reference bit rate ratio R0, and
   the curve defined by y=f1(x) has a tangential line with a negative slope at the intersection point between the curve defined by y=f1(x) and the curve defined by y=f0(x).

8. The transcoder according to claim 4, wherein
   a line defined by y=f1(x) in an x-y coordinate is a straight line and is tangent to a curve defined by y=f0(x) in the x-y coordinate at the point where the bit rate ratio x is equal to the reference bit rate ratio R0.

9. The transcoder according to claim 1, wherein, when
   (i) the area specification function f0(x) is a function defining a first relation between the quantization step value y and a bit rate ratio x=R2/R1, which is a bit rate ratio of a bit rate R2 of the second stream to a bit rate ratio R1 of the first stream,
(ii) the relation determining function f1(x) is a function defining a second relation between the bit rate ratio x=R2/R1 and the quantization step value y, and
(iii) a curve in a x-y coordinate defined by y=f0(x) intersects a curve defined by y=f1(x) at the point of (x0, y0) in the x-y coordinate, each of said area specification function f0(x) and said relation determining function f1(x) is a monotonic decreasing function with respect to x in a range satisfying x>O, and said area specification function f0(x) and said relation determining function f1(x) satisfy the following formula:

$$\frac{d}{dx}f_1(x0) \geq \left| \frac{d}{dx}f_0(x0) \right|,$$

wherein the conversion value calculation processing unit calculates the quantization step conversion value using the relation determining function f1(x) when the bit rate ratio x=R2/R1 satisfies x1<x<x2 (x1<x0, x0<x2), and wherein the conversion value calculation processing unit calculates the quantization step conversion value using the area specification function f0(x) when the bit rate ratio x=R2/R1 satisfies x<=x1 or x>=x2 (x1<x0, x0<x2).

10. The transcoder according to claim 1, wherein the conversion value calculation processing unit calculates the quantization step conversion value using the relation determining function f1(x) when the following formula is satisfied:

$$abs(f1(x)-f0(x))<=th,$$

where abs() is a function to obtain an absolute value of an element and th is a threshold value, and wherein the conversion value calculation processing unit calculates the quantization step conversion value using the area specification function f0(x) when the following formula is satisfied:

$$abs(f1(x)-f0(x))>th,$$

where abs() is a function to obtain an absolute value of an element.

* * * * *

UNITED STATES PATENT AND TRADEMARK OFFICE
CERTIFICATE OF CORRECTION

| | | |
|---|---|---|
| PATENT NO. | : 8,615,040 B2 | Page 1 of 1 |
| APPLICATION NO. | : 13/057111 | |
| DATED | : December 24, 2013 | |
| INVENTOR(S) | : Nobumasa Narimatsu et al. | |

It is certified that error appears in the above-identified patent and that said Letters Patent is hereby corrected as shown below:

On the title page, Item (54) and in the specification, Column 1, the Title should read:

-- TRANSCODER FOR CONVERTING A FIRST STREAM INTO A SECOND STREAM USING AN AREA SPECIFICATION FUNCTION AND A RELATION DETERMINING FUNCTION --

Signed and Sealed this
Eleventh Day of March, 2014

Michelle K. Lee
*Deputy Director of the United States Patent and Trademark Office*